United States Patent [19]  
Bartels et al.

[11] Patent Number: 4,773,844  
[45] Date of Patent: Sep. 27, 1988

[54] APPARATUS FOR PRODUCING A SYNTHETIC RESIN SKIN

[75] Inventors: Hermann A. Bartels, Muehlheim; Erich M. Christoph, Obertshausen; Ruediger Leipnitz, Darmstadt, all of Fed. Rep. of Germany

[73] Assignee: Ymos Aktiengesellschaft Industrieprodukte, Obertshausen, Fed. Rep. of Germany

[21] Appl. No.: 36,030

[22] Filed: Apr. 8, 1987

Related U.S. Application Data

[60] Division of Ser. No. 869,576, Jun. 2, 1986, which is a continuation-in-part of Ser. No. 621,870, Jun. 18, 1984, Pat. No. 4,606,868.

[30] Foreign Application Priority Data

Jun. 5, 1985 [DE] Fed. Rep. of Germany ....... 3520152

[51] Int. Cl.⁴ ............................................. B29C 41/18
[52] U.S. Cl. .................................... 425/435; 264/126; 264/248; 264/249; 264/250; 264/302; 264/310; 264/DIG. 60; 425/395; 425/500; 425/806
[58] Field of Search ............... 425/500, 517, 435, 116, 425/395, 806; 264/248, 249, 255, 302, DIG. 60, 126, 250, 310

[56] References Cited

U.S. PATENT DOCUMENTS

| | | | |
|---|---|---|---|
| 3,079,644 | 3/1963 | Molitor et al. | 264/302 |
| 3,098,779 | 7/1963 | Cox | 264/302 |
| 3,165,565 | 1/1965 | Cox et al. | 264/302 |
| 3,528,133 | 9/1970 | Morse | 425/435 |
| 4,070,434 | 1/1978 | Noda | 264/255 |
| 4,078,761 | 3/1978 | Thompson | 425/435 |
| 4,130,619 | 12/1978 | Held | 264/248 |
| 4,447,373 | 5/1984 | Chappell et al. | 264/248 |
| 4,501,715 | 2/1985 | Barfield et al. | 264/248 |
| 4,634,360 | 1/1987 | Gray | 425/435 |

FOREIGN PATENT DOCUMENTS 1943151 10/1974 Fed. Rep. of Germany.

Primary Examiner—Jay H. Woo
Assistant Examiner—James C. Housel
Attorney, Agent, or Firm—W. G. Fasse; D. H. Kane, Jr.

[57] ABSTRACT

An apparatus for the production of a synthetic resin skin uses a mold for forming at least two separate skin sections which are then joined prior or after a final heat treatment. The synthetic resin skin sections are produced in at least two separate mold members, and the skin sections are then caused to contact each other along determined faces or margins which are joined under light pressure. Any so-called selvage is easily removed after the joining which intimately bonds the skin sections to each other due to the curing of the synthetic resin.

3 Claims, 14 Drawing Sheets

APPARATUS FOR PRODUCING A SYNTHETIC RESIN SKIN

CROSS-REFERENCE TO RELATED APPLICATION

The present application is a divisional application of pending U.S. Ser. No.: 869,576; filed on June 2, 1986; which is a Continuation-In-Part patent application of U.S. Ser. No.: 621,870, filed on June 18, 1984; now U.S. Pat. No. 4,606,868, which issued to Aug. 19, 1986.

FIELD OF THE INVENTION

The invention relates to an apparatus for producing a synthetic resin skin by causing synthetic resin to first melt partially in a mold, whereupon further thermal treatment completes the melting which is followed by cooling for finishing the product.

BACKGROUND OF THE INVENTION

Methods and devices for the production of a synthetic resin skin have been described in various publications and, German Patent Publication No. (DE-AS) 1,943,151, e.g., relates to a method for casting hollow bodies using casting resin. In this publication an initially cold, open mold is first filled with a plastisol, then emptied and then again filled with plastisol and emptied again, while heating the mold wall, whereby a plastisol coating is formed on the inner mold wall surface by gelling or fusing action. Finally, the coating is fused and fully cured by the renewed application of heat. After cooling the synthetic resin skin is removed from the mold.

German Patent Publication No. 3,322,931 which corresponds to the above mentioned U.S. Pat. No. 4,606,868, describes a method in which the synthetic resin is filled into a preheated mold and caused to melt or gel on the inner mold surface to form a thin layer. After emptying of the mold the synthetic resin composition is cured by a further thermal treatment. An important feature of the known method is that the open, preheated mold is first locked to a container to form a hermetic seal. The container is filled with synthetic resin. When the seal has been formed the mold and container are turned through 180°, whereby the synthetic resin flows or falls out of the container into the mold. Thus, a layer of synthetic resin is formed by fusion on the inner mold surface, whereafter the mold and the container are swung back into their upright position in order to clear the superfluous synthetic resin from the mold. In the known method the starting material may either be a plastisol or a pourable synthetic resin powder which is well able to move into mold sections behind back tapers, especially if the mold is vibrated in addition to being turned over.

OBJECT OF THE INVENTION

Taking the above prior art as a starting point, it is an object of the invention to to provide a tool for efficiently performing the above methods and to provide further uses and applications of said methods.

SUMMARY OF THE INVENTION

According to the invention, the synthetic resin skin is first produced piece by piece in separate mold halves and the separate pieces are joined together along defined surfaces, whereby the pieces contact each other, and are then joined together by applying light pressure.

When joining the separately produced parts, these parts fuse along the contact surfaces so that they form a single-piece, homogenous synthetic resin skin, which may be made up of two or more parts for producing a hollow body or of a sheet-like product having any desired curved form. In particular, it is possible to use the united parts to produce articles with a complex structure and with internal reinforcements, or articles with a multi-colored surface, since the individual parts may have different colors if the synthetic resins for making these skin parts have different colorings.

The fitting together of the parts is carried out in accordance with the invention before or directly after the thermal treatment for causing a complete gelling or rather a complete fusion of the synthetic resin, while the parts are still in their mold halves and are not yet cooled down for removal from the mold.

BRIEF DESCRIPTION OF THE DRAWINGS:

In order that the invention may be clearly understood, it will now be described, by way of example, with reference to the accompanying drawings, wherein.

Figure 1:
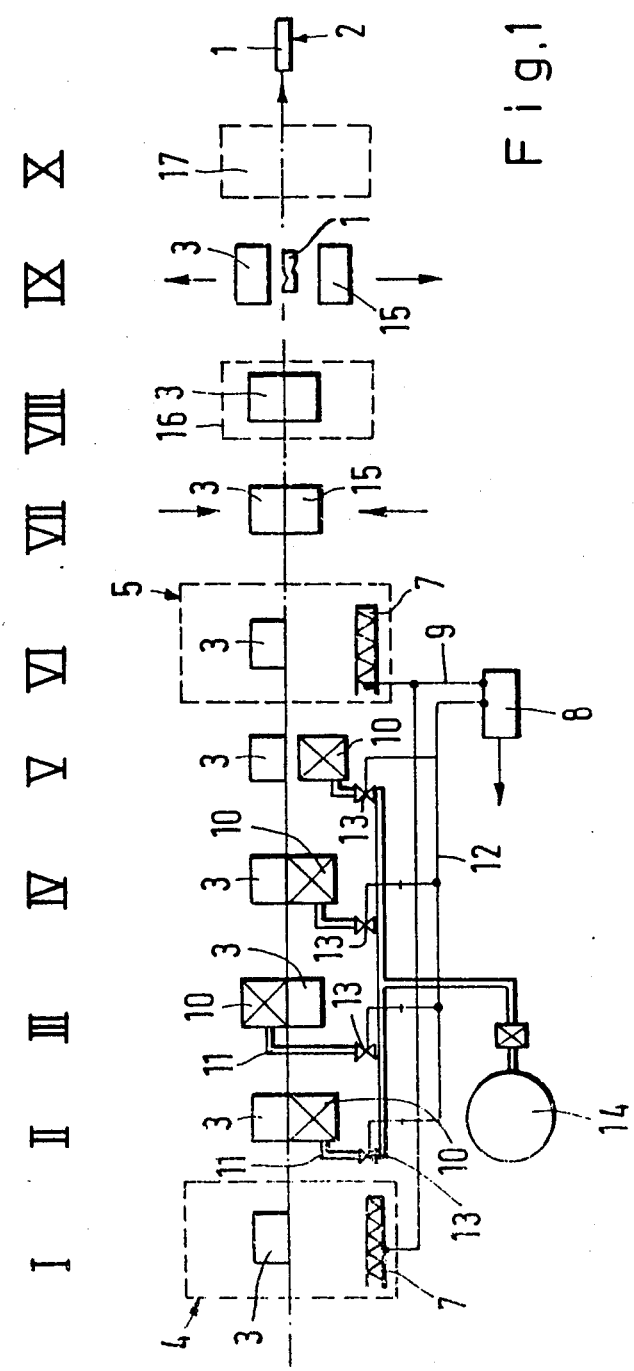
FIG. 1 is a diagrammatic illustration of the individual method steps in the process for which the mold of the invention is used.
Figure 2:
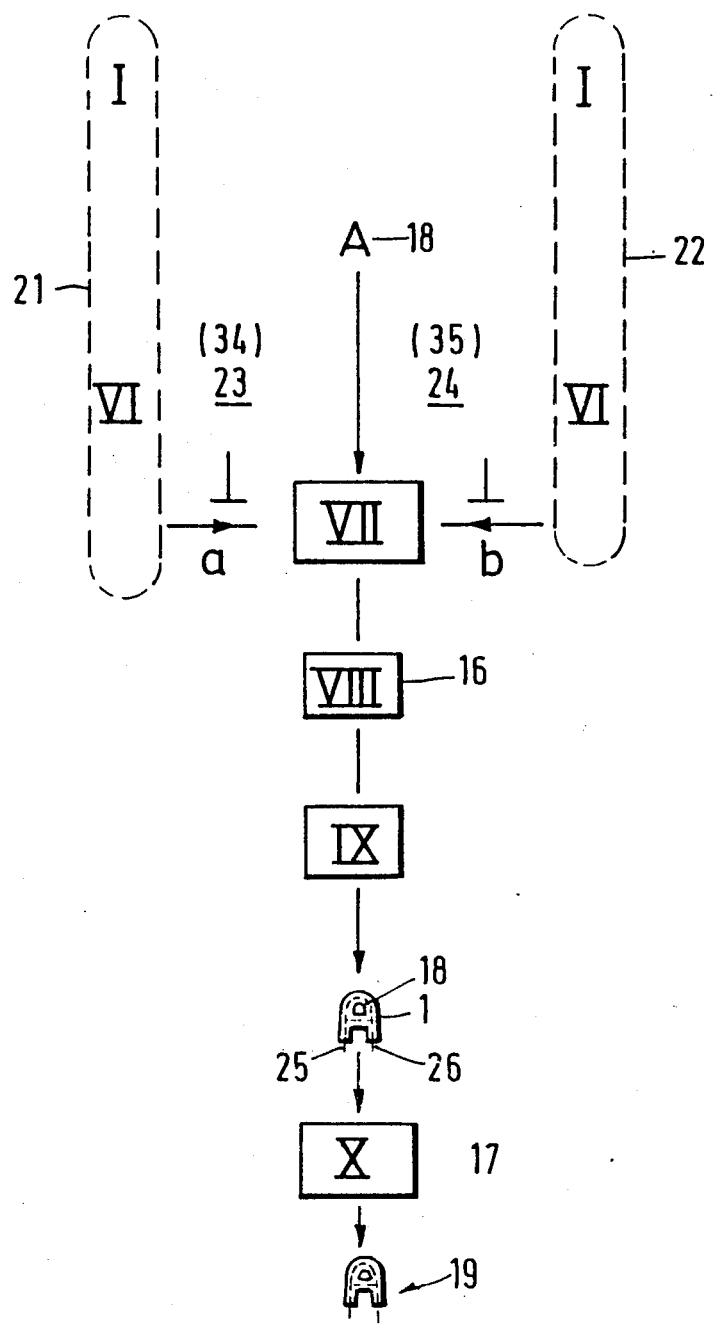
FIG. 2 shows method steps similar to that of FIG. 1, including an additional step for inserting of an internal reinforcement.

DETAILED DESCRIPTION OF PREFERRED EXAMPLE EMBODIMENTS AND OF THE BEST MODE OF THE INVENTION:

A synthetic resin skin 1 comprising two or more component portions is made in a number of steps or stations, whereby FIGS. 1 and 2 merely serve to diagrammatically illustrate one possible example for the production of the component portions of the skin. As soon as the component portions have been assembled to form the single synthetic resin skin 1, the latter is then further processed for forming a foam backing or for filling the skin with a foam in a known way to form a synthetic resin body 2. In a preferred sequence of steps the first step is to preheat a mold half 3 in a heating station I or in an oven 4. This oven 4 is, just as a second oven 5 or a second heating station VI, provided with an electrical heating means 7 which may be controlled by a controller 8 connected to the heater 7 by an electric cable 9. In the heating station I the still empty mold half 3 is heated to a temperature in a range of 80° C. to 230° C. so that the synthetic resin, later to be placed into the mold, will form a gelled or fused layer on the inner surface of the mold. The exact temperature will primarily depend on the nature of the synthetic resin, and will normally be supplied by the manufacturer of the synthetic resin.

When the mold half 3 has reached the desired temperature, it is placed in the next station II on a container 10 filled with synthetic resin so that the opening of the half mold 3 faces downwardly. Conventional clamps, e.g., are used to secure the mold half 3 to the container 10 and a gasket between the mold and the container assures a hermatic seal. Then in station II the mold and the container 10 are inverted so that the synthetic resin in the previously filled container 10 falls into the mold half 3. Preferably, the resin is in the form of a freely flowing powder. The mold half 3 and the container 10 are preferably vibrated during the method step carried out in station III to ensure an ample compaction of the synthetic resin on the inner face of the mold half 3. The residence time in the station III until the synthetic resin gels or fuses corresponds to about 10 to 60 seconds and will depend on the desired layer thickness. Furthermore, a vacuum up to an upper limit of about 50 mbar is maintained in the interior of the container 10 during the method steps performed in stations II and III. The container 10 is connected by a suction conduit 11 through a valve 13 to a vacuum pump 14. The valve 13 is controlled by the controller through a line 12 as is conventional.

In the step performed in station IV the mold half 3 and the container 10 are tilted back into the starting position so that any excess synthetic resin which has not gelled or fused on the inner surface of the mold half 3, may drop back into the container 10. The mold half 3 and the container 10 are preferably also vibrated during the step in station IV so as to be certain that in fact all the excess synthetic resin powder that is still in a granular or powdery condition falls back into the container 10.

The next step is performed in station V in which the mold half 3 is separated from the container 10 and is placed in a second heating station VI so that the initially gelled or fused synthetic resin is now caused to completely gel or melt on the inner mold surface.

It is to be understood that the reference to stations II to V in FIG. 1 does not mean that actually separate locations are involved. In fact, method steps for the mounting of the mold half 3 on the container 10, tilting, vibrating, evacuation to produce reduced pressure, tilting back into a non-inverted position and separating the mold half 3 from the container 10 may take place at one and the same location.

The mold half 3 remains in the heating station VI until the synthetic resin or the synthetic resin composition has completely gelled or fused without, melting to such an extent that it would run off the inner surface of the mold half 3. For this purpose, a residence of treatment time of 1 to 6 minutes at a temperature of 110° C. to 220° C. is employed, dependent on the type of synthetic resin used for making the synthetic resin skin 1.

When the synthetic resin composition has completely melted or gelled or fused in the manner just indicated, it is moved into a station VII where it is joined with a separately produced and fully fused further portion of the entire synthetic resin skin also still in its mold half 15. Such joining takes place along certain defined surfaces, preferably the edges thereof, by bringing these edges into contact with each other and then applying a light pressure. This is illustrated in station VII (FIG. 1) with the aid of the two arrows with reference to the two contacting mold halves 3 and 15. The joining pressure will depend on the type of resin used and is generally in the range of 5–10N/cm$^2$.

With the joining of the two mold halves 3 and 15 the respective component skin portions are also automatically joined at selected areas or along coordinated edges. Then the two mold halves 3 and 15 are cooled prior to removal of the finished synthetic resin skin 1. This cooling takes place, for example, in a water bath 16 into which the halves 3 and 15 are dipped in station VIII.

The synthetic resin skin 1, or rather the finished product, is removed from the two mold halves 3 and 15 after the same have been opened in station IX of FIG. 1. The skin is then filled with foam in a foaming mold 17 as indicated in station X, if the synthetic resin skin 1 encloses a hollow space, or if the skin is backed with foam if the skin is a sheet-like structure curved in space, as for example, for covering the outer surface vehicle dashboard 60 in FIG. 8. The synthetic resin body 2 heaves the foaming mold 17 as a finished product with the synthetic resin skin 1 forming its outer surface.

If the synthetic resin body 2 is not only to be given a foam backing, or is to be filled with foam, but in addition is to be strengthened with a internal reinforcement 18, such reinforcement is placed in position between the component portions when they are still in station VII prior to fitting the component portions together. Insertion of the reinforcement is diagrammatically indicated in FIGS. 2 and 5 with refrence to the mold halves 3 and 15 for manufacturing a motor vehicle head rest 19. Whereas FIG. 1 only shows the separate manufacture of the component portions on the basis of a single sequence of stations or steps. FIG. 2 is a diagram of the method steps or order of stations for the parallel, separate manufacture of the component portions of the synthetic rsin skin 1. The additional insertion of an internal-reinforcement 18 as is needed, for example, for the manufacture of a motor vehicle head rest 19 is shown in FIG. 2.

FIG. 2 shows two separate devices 21 and 22 for carrying out the method steps I to VI involving the stations I to VI for the production of two component portions 23 and 24, respectively, which are fitted together in the station VII to form a hollow body of the synthetic resin skin 1. Before joining, the internal reinforcement 18 is placed between the mold halves 15 and 16 in station VII, whereby the reinforcement is embedded in the interior of the synthetic resin skin after the joining. The cooling of the mold halves 3 and 15 again takes place in station VIII so that a finished synthetic resin skin 1 with the internal reinforcement 18 embedded therein, is available in station IX. The described example is specifically a head rest 19. Hence, the connection members 25 and 26 of the internal reinforcement 18 are projecting out of the synthetic resin skin 1 which is finally filled with foam in the foaming mold 17 in station X, whereafter the motor vehicle head rest 19 is finished.

It is important that the component portions 23 and 24 in station VII only make contact with the internal reinforcement at a limited number of defined positions, as is the case, for example of the connection members 25 and 26, which emerge from the synthetic resin skin. Due to the shape of shell-like form of the mold halves 3 and 15, however, it is possible to ensure that there is no contact between the synthetic resin skin 1 and the internal reinforcement 18.

Further details of the method and the present molds which may conveniently be used for performing the method will now be explained with reference to the mold halves 15 and 16 for the motor vehicle head rest 19 and with reference to mold halves for a motor vehicle dashboard made of a number of parts, as shown in FIGS. 8 to 13.

Figure 3:
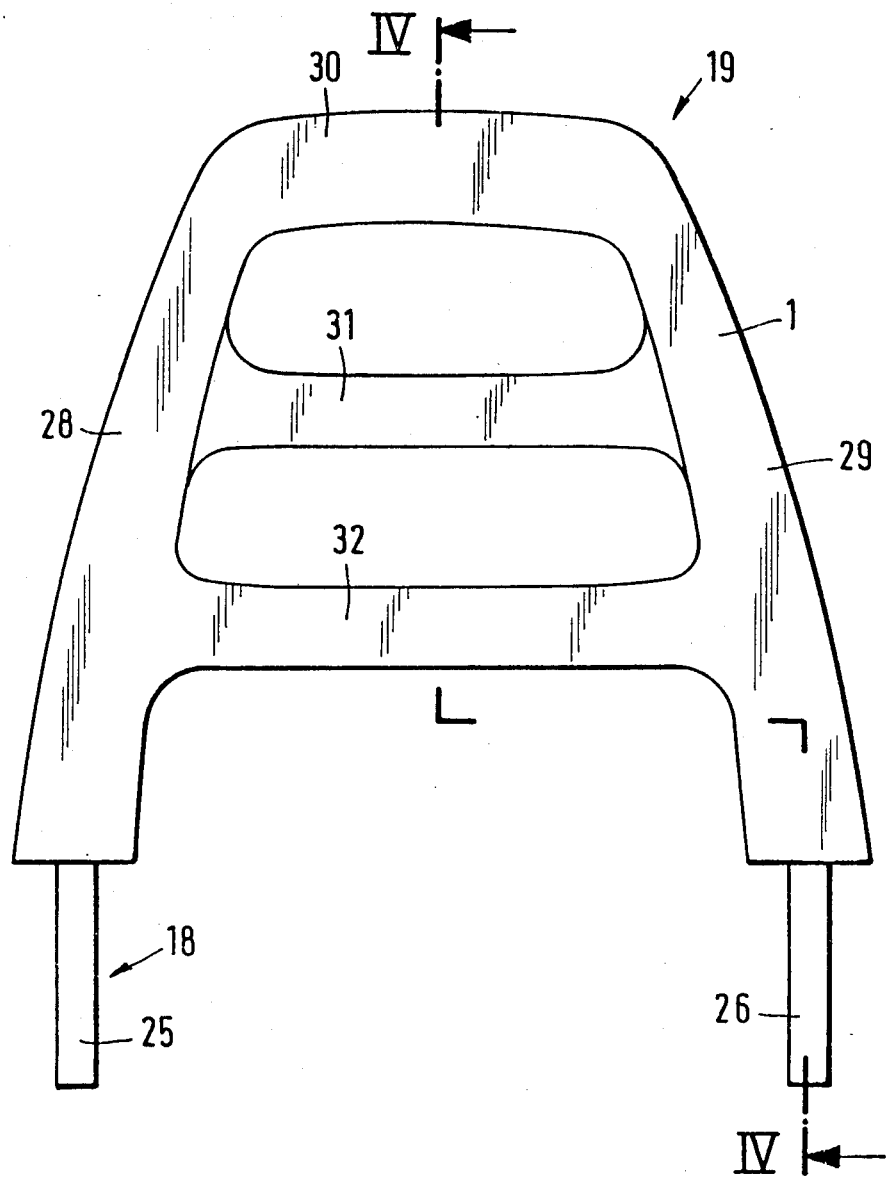
FIG. 3 is a view of a head rest with an internal reinforcement.
Figure 4:
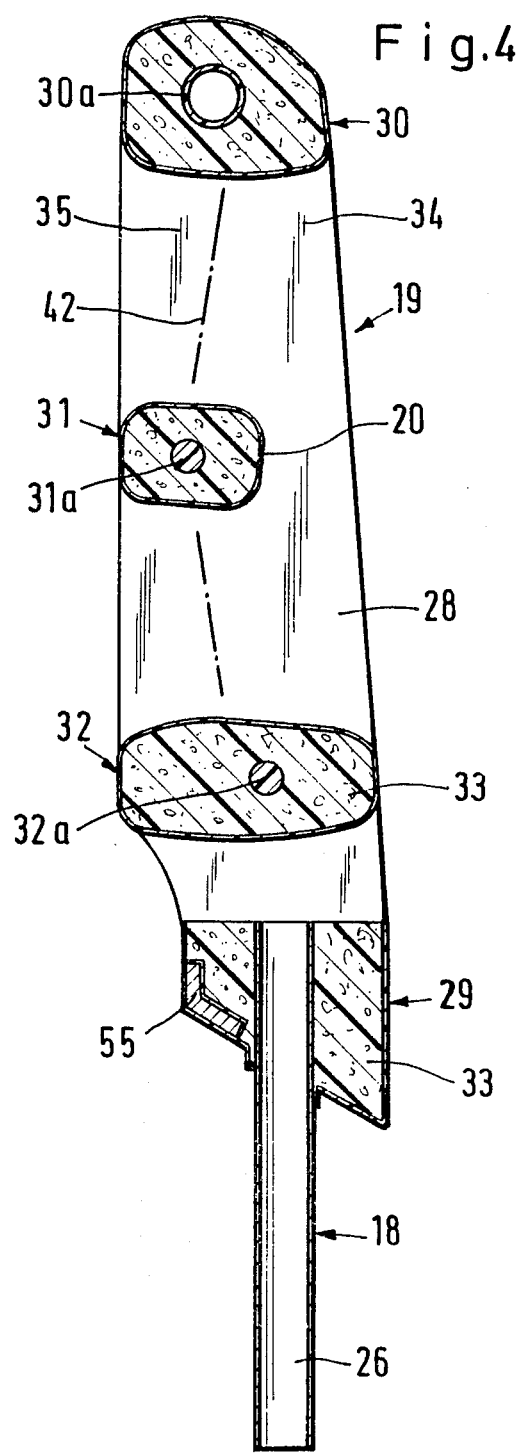
FIG. 4 is a section taken on line IV—IV of FIG. 3.

The motor vehicle head rest 19 includes a frame with side members 28, 29 and cross bars 30, 31 and 32. The reinforcement 18 is located in the interior along with two freely accessible connection members 25 and 26. The internal reinforcement 18 also forms a frame and is placed in both of said members 28 and 29 and in the bars 30, 31 and 32. The outer surface of the head rest 19 is a synthetic resin skin 1 and between the skin and the internal reinforcement 18 there is load-bearing synthetic resin foam which is introduced after manufacturing of the skin. Just as the entire head rest 19, the internal reinforcement 18 has bars 30a, 31a, and 32a which are embedded in the synthetic resin foam 33 surrounded by the integral synthetic resin skin 1 as shown in FIGS. 3 and 4.

Figure 5:
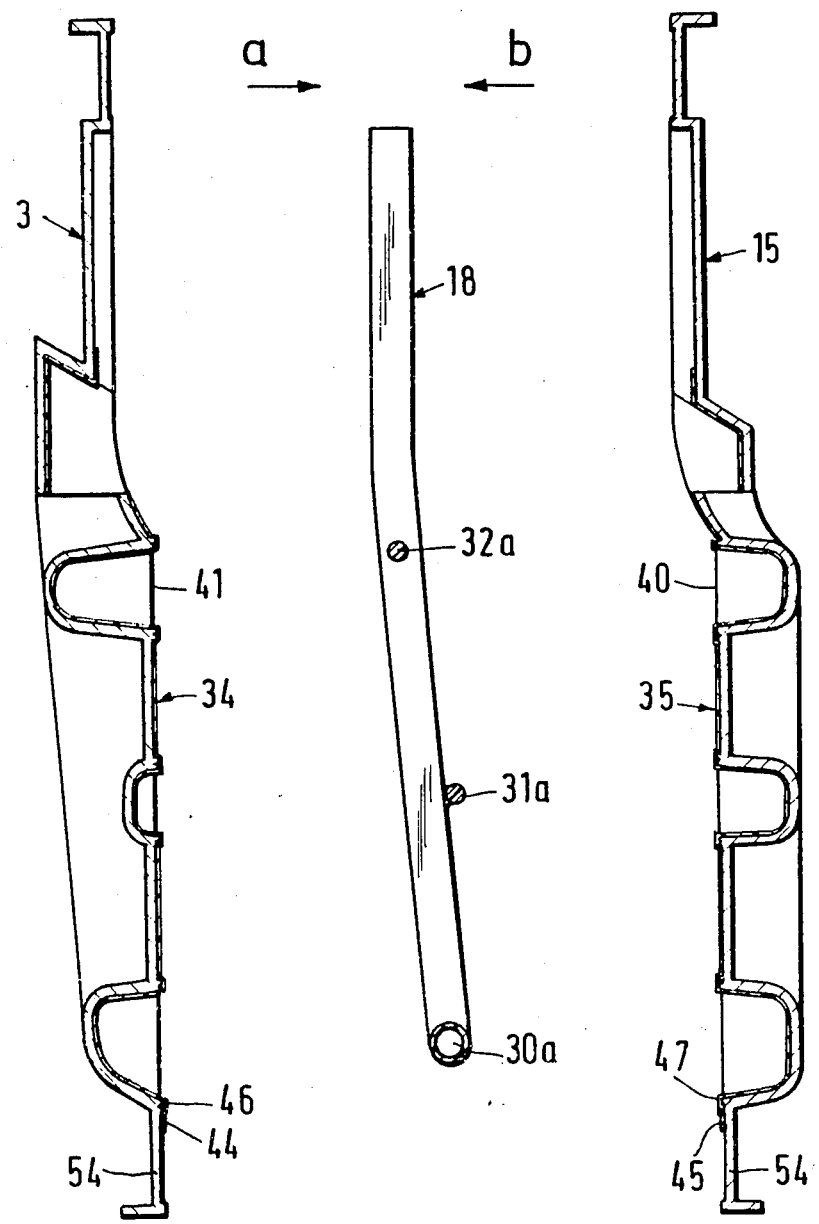
FIG. 5 is an exploded view and section of two mold halves with component portions of a synthetic resin skin as part of a head rest and with an internal reinforcement to be placed in the mold.

The production of the synthetic resin skin 1 for the head rest 19, first involves the separate production of the two component portions 34 and 35 in the two mold halves 3 and 15 in accordance with FIG. 5, as mentioned. For this purpose, the mold halves 3 and 15, after heating, are separately placed on containers filled with synthetic resin and then undergo the steps in stations III to VI. When the two component portions 34 and 35 have completely gelled or fused or melted, they are put together in station VII as indicated by the arrows "a" and "b", and the internal reinforcement 18 is inserted. When the mold halves are joined the component portions 34 and 35 make contact with each other at selected positions or areas. In the case of the component portions 23 and 35 of a synthetic resin skin 1 for the head rest 19 these positions will specifically be the surrounding edges 40 and 41. Depending on the configuration in a specific case, the surfaces coming into contact with each other may be internal or other surfaces. A light pressure causes the component portions 34 and 35 to bond along their contact faces or edges 40 and 41, whereby the portions 34 and 35 fuse to form a homogeneous synthetic resin skin 1.

Figure 7:
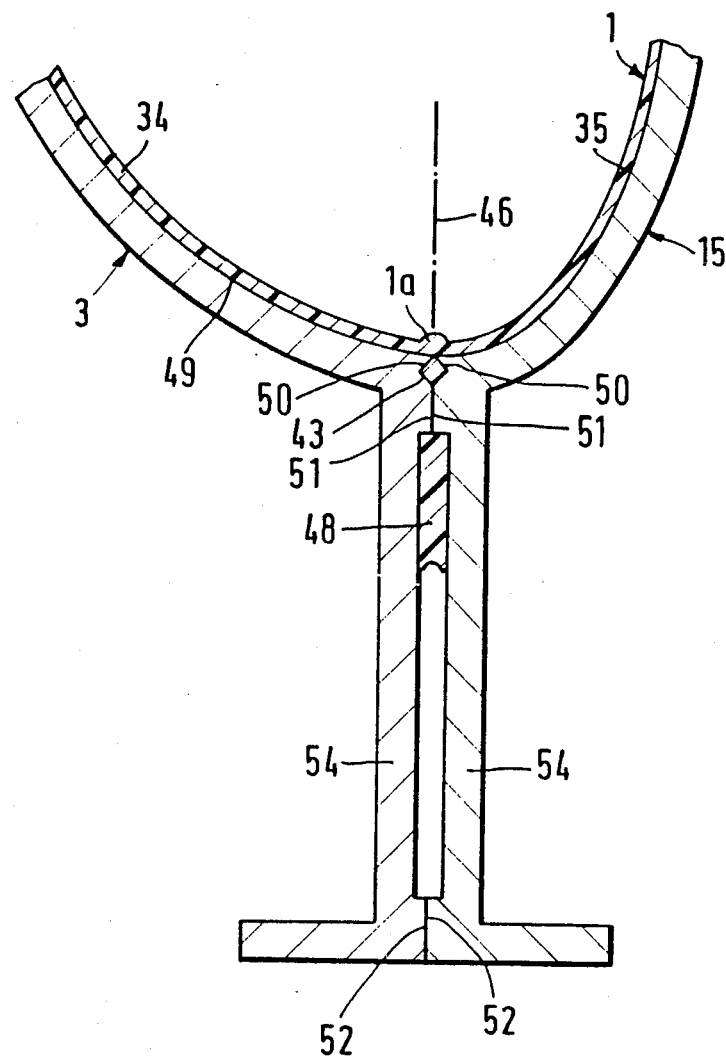
FIG. 7 is a section as in FIG. 6, taken through two mold halves with two component portions joined to form the synthetic resin skin.

In order to prevent the formation of a conspicuous seam 42 on the visible surface of the finished synthetic resin skin 1, adjacent to the line of contact of the two component portions 34 and 35, the mold halves 3 and 15 not only have raised and sunken parts for forming the component portions 34 and 35 in the desired manner, but are also so shaped at the abutting edges 40 and 41 that, on assembly, protruding flaps or strips 43, as shown in FIG. 7, are formed on the visible side of the finished synthetic resin skin which may b broken off easily by a brush or by hand.

In the production of the synthetic resin skin 1 for a head rest 19 the component portions 34 and 35 are not joined together over large areas of contact but have butt joints. This means that when two edges 40 and 41 form such a butt joint the actual area in contact is not broader than the thickness "c" of the material, see FIG. 6, of the finished synthetic resin skin 1. As will be gathered from FIG. 5, and the detail shown in FIGS. 6 and 7 on a larger scale, the synthetic resin composition starts to gel or fuse or melt on the mold halves 3 and 15 with the dimensions of the synthetic resin skin 1. Additionally, margins 44 and 45 are formed which extend away from the areas 46 and 47 of the component portions 34 and 35 for forming a butt joint generally at a right angle. After assembly, these margins form the flap or trip 43 and possibly a further strip 48 as indicated in FIG. 7, and the flaps make sure that there is sufficient material present at the areas 46 and 47 for producing a sealing joint.

Where the plane 46 and the outline of the mold face 48 meet a pinching edge 50 on the respective mold halves 3 and 15. Furthermore, the mold halves 3 and 15 have a first support face 51 and a second support face 52 spaced from the first face 51 extending in a direction substantially at a right angle to the outer face 49 of the component portions 34 and 35 in the plane of the area 46 and spaced from the pinching edge 50. Between the two support faces 51 and 52 there is a recess 53. There is a respective flange 54 on the mold halves 3 and 15 having the two faces 51 and 52 and the recess 53.

The distance between the pinching edge 50 and the first support face 51 is comparatively small and a recess 43a with a preferably triangular cross-section is located in the face 51. The recess 53 between the two support faces 51 and 52 preferably has the form of a channel.

Figure 6:
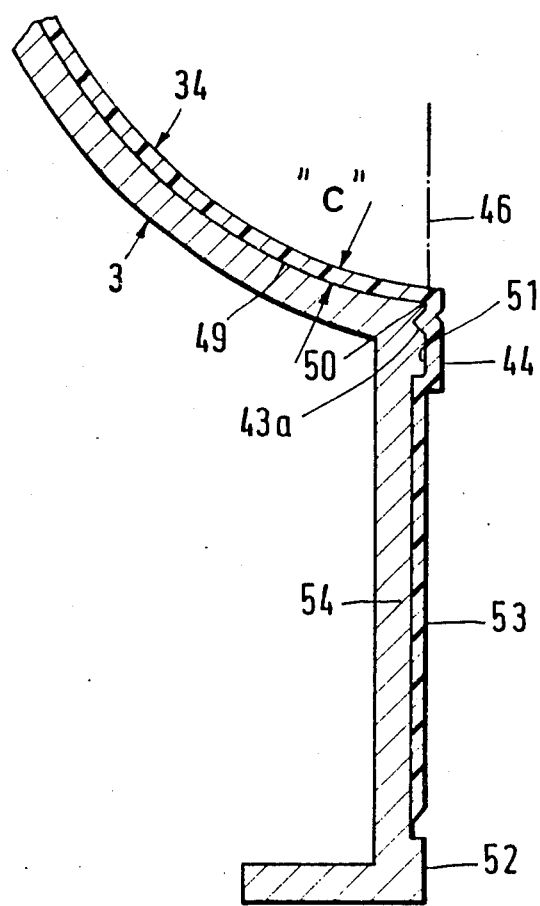
FIG. 6 shows, on a larger scale, a section through a part of an edge of a mold half.

As will be seen from FIGS. 5 and 6, the initial gelling or melting or complete fusing of the synthetic resin during the production of the component portions 34 and 35 also takes place around the pinching edge 50, over the support face 51, and within the channel-like recess 53. A further necessary condition in this respect is that the container connected with one of the mold halves 3 and 15 leave exposed, or fit around, support face 51 and recess 53.

When the mold halves 3 and 15 are assembled the pinching edges 50 in the outline of outer face 49 of the synthetic resin skin 1 make contact with each other. The same happens for the support faces 51 and 52 on the flange 54 of the two mold halves 3 and 15. The edges of synthetic material on the flanges 54, 55 have started to gel or have fully gelled or fused or melted and are displaced when the mold halves are pressed together, thereby forming a tear-off lug or flap 43 in the triangular recesses 43a, and in the channel-like recesses 53 they form the strip 48. Between the pinching edges 50 on the two sides and between the support faces 51 on the two sides there is either no material, or only a very thin layer which may be readily pulled off, particularly along the pinching edges 50 after cooling the synthetic resin skin 1 following removal from the mold. Generally, a small bead 1a is formed on the inner side of the synthetic resin skin 1. Since the thickness of the synthetic resin skin 1 or of its component portions 34 and 35 is very small, the method of the invention involves a connection of butt joints along a line between edges of a synthetic resin layer which has not so far cooled down and has in fact only just become fully gelled or molten or fused and these butt joints are formed as a result of the curing of the synthetic resin material.

It will be seen from FIG. 4 that, prior to assembly, inlays 55 of metal or of synthetic resin of any desired sort and for any desired purpose may be placed on the component portions 34 and 35 and joined thereto by light pressure resulting in a proper bonding when the resin is fully cured. Since the component portions 34 and 35 are still hot and the properties of the material are therefore such as to make bonding possible, there will be a reliable anchoring of the inlays 55 to the synthetic resin skin 1 when the curing is completed.

Figure 8:
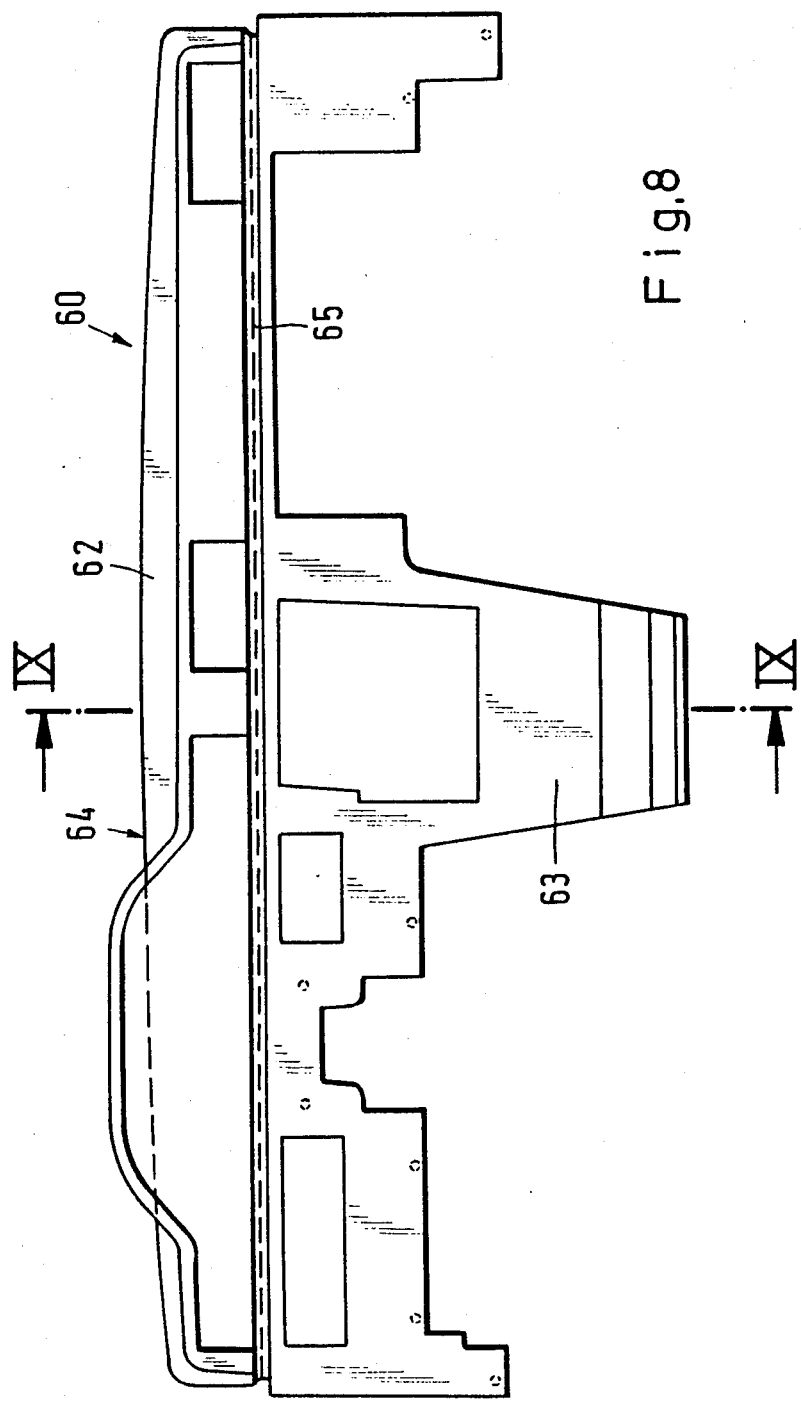
FIG. 8 is a view of a motor vehicle dashboard made with the present method.
Figure 9:
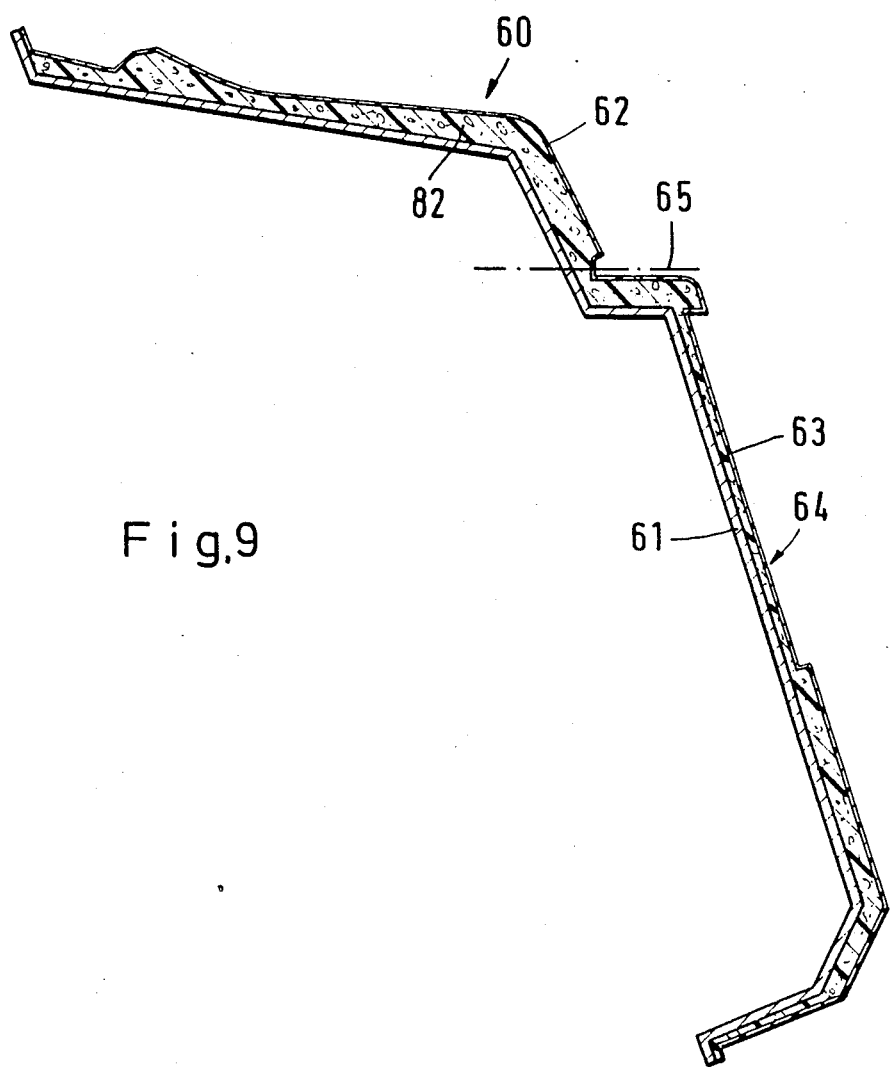
FIG. 9 shows, on a larger scale, a section taken on line IX—IX of FIG. 8.
Figure 11:
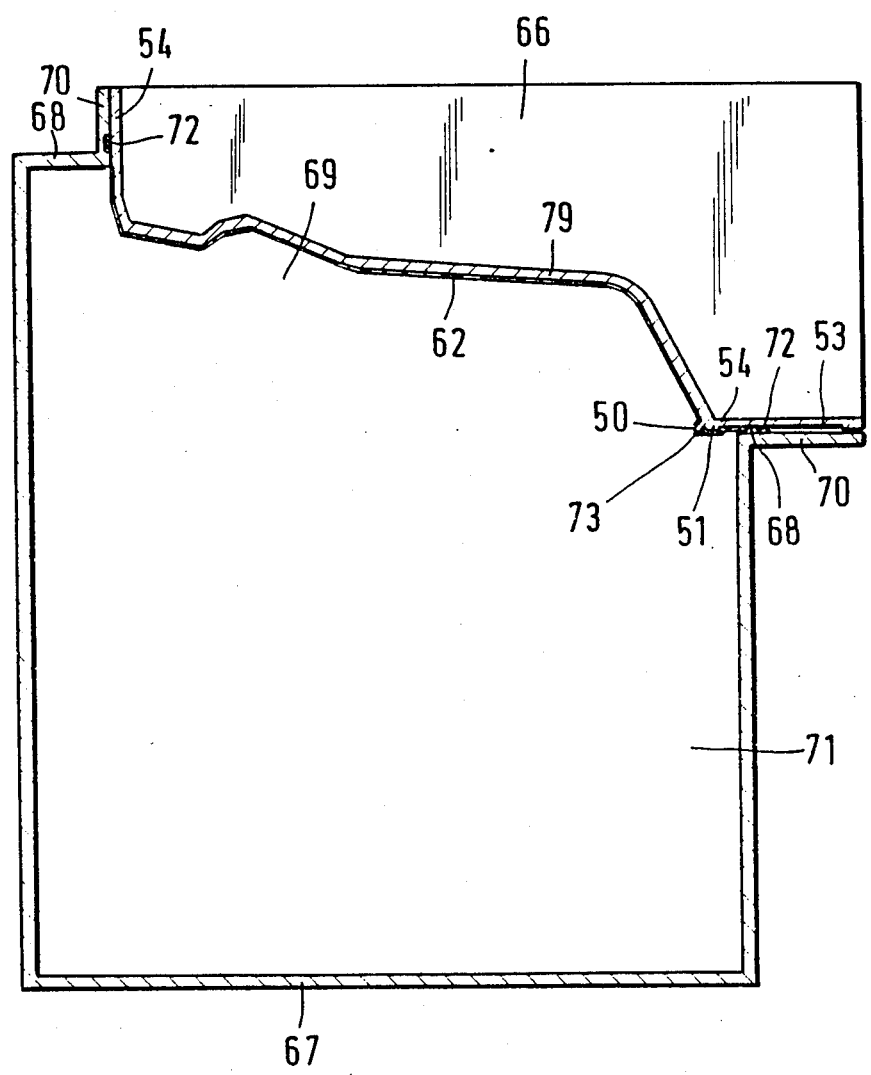
FIG. 11 is a section similar to that of FIG. 10 taken through the mold half of the other component portion of the synthetic resin skin for the motor vehicle dashboard shown in FIGS. 8 and 9.

FIGS. 8 and 9 show a motor vehicle dashboard 60 having a metallic or synthetic resin base 61 and a synthetic resin skin 64 made of component skin portions 62 and 63 with a foam backing. The parting line 65 shown in FIG. 9 between the two component skin portions 62 and 63 runs horizontally in FIG. 8 and may be covered with a molding or the like. The component skin portion 62 shown in FIG. 9 is manufactured in a mold half 66 and a container 67 as shown in FIG. 11. The edge 68 of the opening 69 of the container 67 has various steps in accordance with the form of the component skin portion 62 to be molded. The steps extend in different planes which are at an angle to each other and which have different slopes. The significant point is, however, that the edge 68 fits the outline of the component skin portion 62 and corresponds to the configuration of the mold half 66 to assure a proper seal between the mold and container. Furthermore, the edge 68 of the container 67 has portions 70 which do not have to be in a single plane or in parallel planes and may be at an angle to each other as is shown in FIG. 11. The portions 70 of the container 67 are contacted by corresponding edge portions or flanges 54 of the mold half 66 in such a way that both the pinching edge 50 and also the first support face 51 and a part of the channel-like recess 53 project into the interior 71 of the container 67 so that a skin may also be formed on face 51 and in recess 53. The respective edge portions 54 and 70 of the mold half 66 and of the container 67 extend in parallel to each other and are provided with appropriate seals 72.

The example embodiment of the invention as shown in FIG. 11 indicates that the effective area 73 of the component skin portion 62 is spaced from the edge 68 of the container 67 when the skin portions 62 and 63 are assembled. For this purpose the respective edges or flanges 54 of the mold half 66 project somewhat into the interior 71 of the container 67. The other edge or flange 54 shown in FIG. 11 does not have a pinching edge 50 because there is no area or surface corresponding to the area 73 for the assembly.

Figure 10:
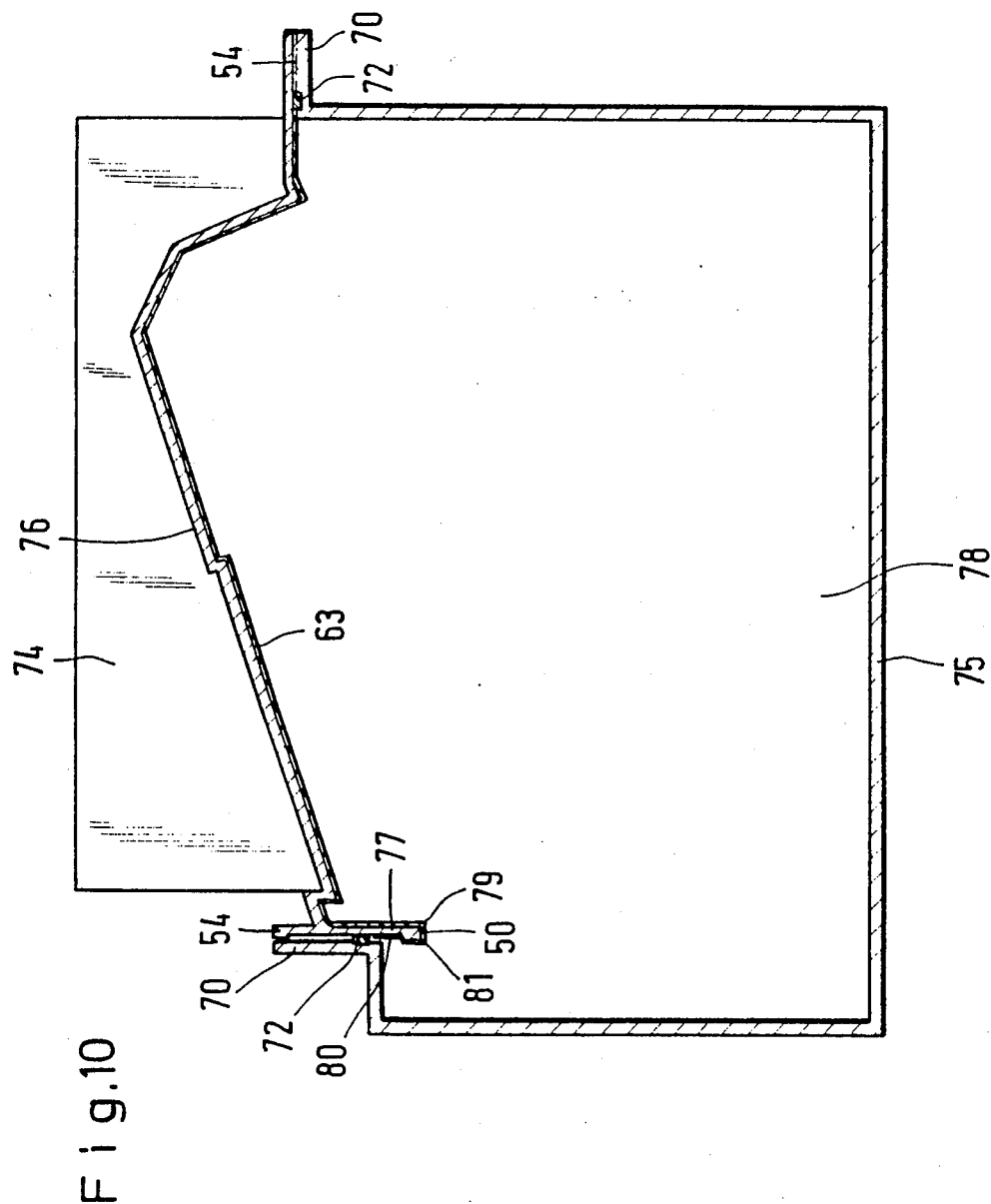
FIG. 10 is a section through a mold half, locked to a synthetic resin container in a form-locking, hermetically sealing manner for a component portion of the synthetic resin skin for the vehicle dashboard shown in FIGS. 8 and 9.
Figure 12:
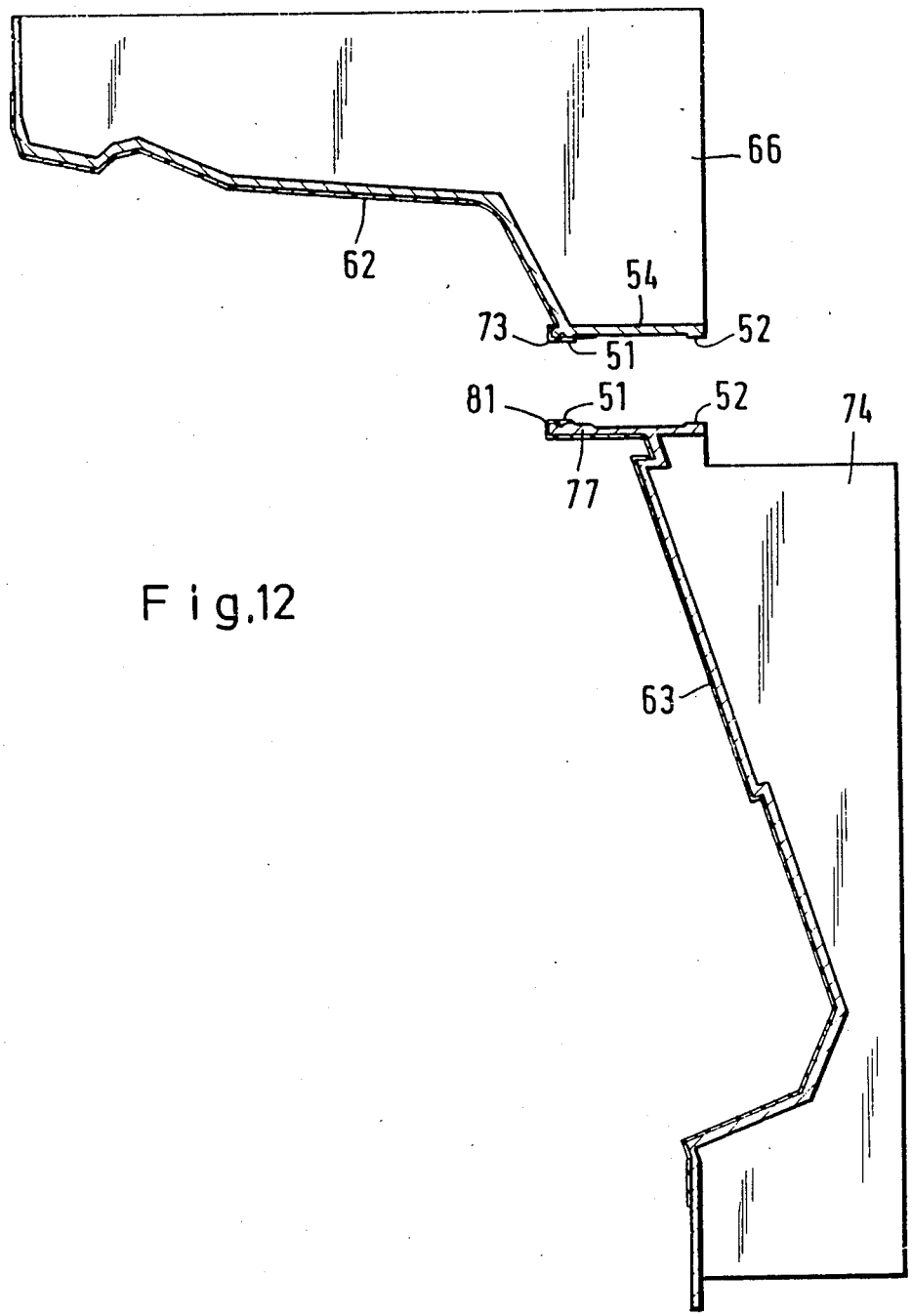
FIG. 12 is a partial section taken through the two mold halves of the synthetic resin skin for the motor vehicle dashboard of FIG. 8, immediately prior to filling the mold halves together.

Referring to FIG. 10, the other component skin portion 63 of the synthetic resin skin 64 to be manufactured is produced with the aid of one mold half 74 and a container 75 of such a shape that it is able to make a sealed joint with the mold half. The above comments apply here as well, i.e. the form and configuration of the mold half 74 and its effective mold wall 76 and the form of the container 75 are dependent on the outline or cross-section of the component skin portion 63, and furthermore edges or flanges 54 are provided on the mold half 74 and edges or flanges 70 are provided on the container 75. Referring also to FIG. 12, a marginal rib 77 extends from the flange 54 of the mold half 74 directly into the interior 78 of the container 75 and has a free edge 79 on which the synthetic resin composition initially gels or becomes completely attached by fusion. The use of a marginal rib 77 extending freely into the interior 78 of the container 75 is due to the form and configuration of the component skin portion 63 and enables the formation of flange 80, which after assembly of the two skin portions forms a tear-off strip, and a strip 48 as in FIG. 7 with a similar flange on the other component skin portion 62. The pinching edge 50 and the fusing surface 81, abutting the surface 73 of the component skin portions 62, are located on the free edge 79 of the marginal rib 77.

For the sake of simplicity, the synthetic resin in the containers 67 and 75, the connections for evacuating, the means for placing the mold halves on the containers and the devices for tilting or vibrating these parts are not shown in FIGS. 10 and 11. Such means are well known.

Figure 13:
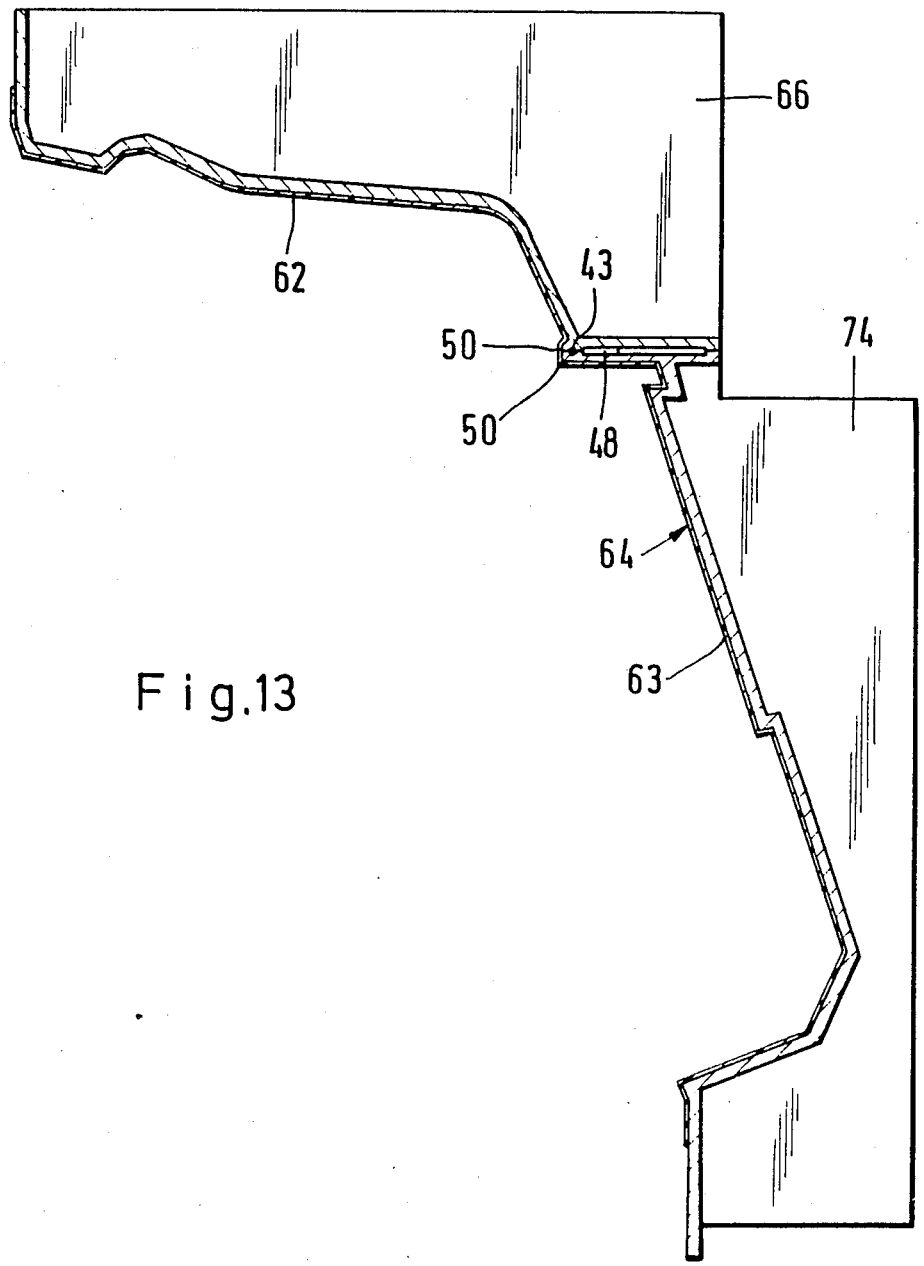
FIG. 13 is a partial section as in FIG. 12 taken through the two mold halves with the component portions fitted together as a homogeneous synthetic resin skin.

As soon as the component skin portions 62 and 63 have fully gelled or fused, they are aligned as shown in FIG. 12 and then moved toward each other as indicated in FIG. 13 so that their faces 73 and 81 contact each other to make a fusion joint when a light pressure is applied. The two pinching edges 50 also make contact in the plane of the outline of the synthetic resin skin 64 and cause the formation of the tear-off lug or flap 43 and of the strip 48.

Just as is the case with the embodiment described in connection with FIGS. 6 and 7, there are support faces 51 and 52 on the flanges 54 and 77 and they make contact over large areas when the component parts are assembled.

After detaching the synthetic resin skin 64 from the mold halves 66 and 74 a foam backing 82 of foam synthetic resin 82 is formed as shown in FIG. 9. Any further steps, which are not important in the presnt context, may then also be performed.

Figure 14:
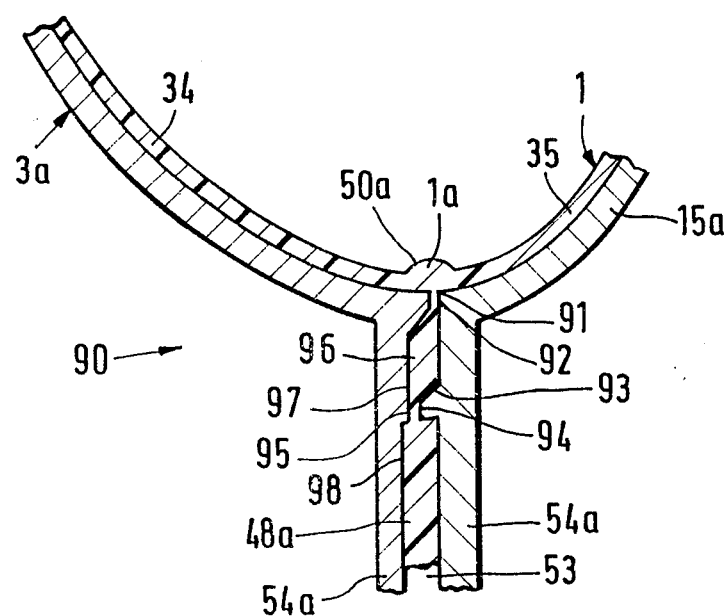
FIG. 14 is a section as in FIG. 7, but showing a modified embodiment of the invention.

FIG. 14 shows two mold halves 3a and 15a with a modified engaging edge or flange 90 for producing a synthetic resin skin 1 of component portions 34 and 35. The two mold halves 3a and 15a, as the embodiment of the invention of FIGS. 6 and 7, have mutually parallel edges or flanges 54a with channel-like recesses 53a for forming the strip 48a. In place of having a respective pinching edge 50 on the two mold halves 3 and 15 as in FIGS. 6 and 7, the embodiment of FIG. 14 has only one pinching edge 50a on one mold half 3a. The pinching edge 50a directly cooperates with the edge 91 on the rim 92 of the other mold half 15a and is formed as an encircling raised part related to the marginal flange 54a of the mold half 3a. The other mold half 15a is also provided with an encircling raised part 93 spaced from the edge 91 of the rim 92. In the assembled condition shown in FIG. 14, a support face 94 of this raised part 93 engages a face 95 extending in parallel to the rib on which the pinching edge 50a slopes downwardly toward the rib or the edge flange 54a. When the two mold halves 3a and 15a are put together, the pinching edge 50a and the raised part 93 form a chamber with a generally trapezoidal cross-section. The synthetic resin located in this chamber forms a tear-off lug or flap 97 having a size depending on the height of the pinching edge 50a above the surface 95 or the height of the raised part 93 above the edge 91, and the distance of the raised part 93 from the edge 91.

Behind the support face 94 in relation to the pinching edge 50a the opposite surface 95 of the other mold half 3a also has a step 98 for forming the recess 53a.

The configuration of the edge or flange at which the mold halves engage each other, may have quite different forms. The important point is that there is a pinching edge on the flange of at least one mold half and that the marginal ribs are of such a form that outside the pinching edge an encircling chamber or annular chamber is formed in which a tear-off lug or tear-off strip is produced when the two mold halves are assembled. Such lug, or strip, or flap is either not connected with the synthetic resin skin 1 or it is only connected by an extremely thin web, due to the action of the pinching edge.

The method of the invention makes it possible to produce hollow bodies with complex shapes of several parts of a synthetic resin skin and to provide them with internal parts. The material for the skin may, for instance, be a polyvinyl chloride (PVC) powder mixture which may contain further agents or components facilitating the processing and ensuring the desired properties of the product. Such agents or components are known in the art. However, it is also possible to utilize thermoplastic polyurethane (PUR) or other thermoplastics in powder form. The same is true of polyurethane reaction mixtures in powder or liquid form. If synthetic resin powder is employed it has to flow freely, be dry and free of adhesive properties so that it forms a skin of even density with a continuous surface. The assembly of the component portions takes place while these portions are still in the fused condition. In accordance with the described embodiments of the invention the assembly takes place after full gelling or full fusion or melting of the component portions, although it may also be accomplished just after initial gelling or initial fusing or initial melting. The only consequence of a partial initial gelling or fusing is that the mold halves 3 and 15 in accordance with FIG. 1 are not separately subjected to a thermal treatment in the heating station VI but are treated together in a connected condition.

The two stations VI and VII of FIG. 1 are therefore exchanged, one for the other.

The synthetic resin in the containers is replensihed as often as required. The containers remain cold during all the method steps.

Although the invention has been described with reference to specific example embodiments, it will be appreciated, that it is intended to cover all modifications and equivalents within the scope of the appended claims.

What we claim is:

1. An apparatus for producing three-dimensionally shaped thin skin portions of synthetic material, said skin portions having edges to be joined to each other to form substantially a butting joint between neighboring skin portions, comprising a mold section having a first flange (54) extending from a wall of said mold section, a container section for holding an uncured synthetic material, said container section having a second flange (70) extending from a wall of said container section for cooperation with said first flange in joining said mold section to said container section for a skin portions molding operation, said first flange of said mold sections comprising a pinching edge (50) for reducing a thickness of a skin portion edge, a first support surface (51) closely spaced from said pinching edge (50), a groove (43) between said pinching edge (50) and said first support surface (51), a second support surface (52) spaced from said first support surface (51), a recess (53) between said first and second support surfaces (51 and 52), said first flange extending from said mold section wall a distance greater than the distance said second flange extends from said container section wall such that, when said first and second flange cooperate with each other in said skin portion molding operation, said pinching edge (50), said groove, said first support surface (51), and at least a portion of said recess (53) being open for communicating with said container section for receiving said uncured synthetic material whereby a subsequently usable selvage skin rim is formed on said pinching edge, in said groove, and on said recess portion.

2. The apparatus of claim 1, wherein said first flange has a rib (77) projecting freely into said container section, at least said pinching edge being located on said rib.

3. The apparatus of claim 2, wherein said groove (43) and said first support surface (51) are also located in said rib (77).

* * * * *